June 6, 1933.   S. B. SANFORD   1,913,043
SWITCHING MECHANISM
Filed July 6, 1932   7 Sheets-Sheet 1

Selden Bradley Sanford INVENTOR
BY Walter E. Bradley ATTORNEY

June 6, 1933.  S. B. SANFORD  1,913,043
SWITCHING MECHANISM
Filed July 6, 1932   7 Sheets-Sheet 2

Selden Bradley Sanford  INVENTOR
BY Walter E. Bradley  ATTORNEY

June 6, 1933.  S. B. SANFORD  1,913,043
SWITCHING MECHANISM
Filed July 6, 1932   7 Sheets-Sheet 3

Selden Bradley Sanford INVENTOR
BY Walter E. Bradley   ATTORNEY

June 6, 1933.  S. B. SANFORD  1,913,043
SWITCHING MECHANISM
Filed July 6, 1932  7 Sheets-Sheet 4

Selden Bradley Sanford INVENTOR
BY Walter E. Bradley ATTORNEY

June 6, 1933.  S. B. SANFORD  1,913,043
SWITCHING MECHANISM
Filed July 6, 1932  7 Sheets-Sheet 5

Selden Bradley Sanford  INVENTOR
BY Walter S. Bradley  ATTORNEY

June 6, 1933.   S. B. SANFORD   1,913,043
SWITCHING MECHANISM
Filed July 6, 1932   7 Sheets-Sheet 6

Selden Bradley Sanford   INVENTOR
BY   Walter E. Bradley   ATTORNEY

June 6, 1933.  S. B. SANFORD  1,913,043
SWITCHING MECHANISM
Filed July 6, 1932  7 Sheets-Sheet 7

Selden Bradley Sanford INVENTOR
BY Walter E. Bradley ATTORNEY

Patented June 6, 1933

1,913,043

UNITED STATES PATENT OFFICE

SELDEN BRADLEY SANFORD, OF YONKERS, NEW YORK, ASSIGNOR TO OTIS ELEVATOR COMPANY, OF NEW YORK, N. Y., A CORPORATION OF NEW JERSEY

SWITCHING MECHANISM

Application filed July 6, 1932. Serial No. 621,041.

The present invention relates to switching mechanism having a plurality of stationary contacts and movable contacting means for successively engaging the stationary contacts, such mechanism being of especial utility in elevator installations in which the stationary contacts are provided for the various floors served by the car and the contacting means is moved in accordance with the movement of the elevator car. Such mechanism is known by various terms in the elevator industry, such as selectors, floor controllers and commutators.

Present day buildings have a wide range in height. This involves the provision of switching mechanism actuated in accordance with movement of the elevator with a correspondingly wide range in effective stationary contacts. It is desirable that such mechanisms be provided as economically as possible.

One feature of the invention resides in the provision of switching mechanism actuated in accordance with car movement which may be arranged in one or more units.

Another feature of the invention resides in automatically transferring the circuits from one unit to another at the desired times in the operation of the system.

Although applicable to various elevator control and signalling systems, the invention will be described as applied to remote control systems for elevators. In elevator installations employing systems of remote control, the number of circuit controlling contacts provided by the switching mechanism at the receiving station depends upon the use to which the system is put and the character of the installation. For example, in remote control systems for indicating the position of the elevator car in the hatchway, a large number of different indications and therefore switching mechanism with a large number of circuit controlling contacts may be desirable. The principles and advantages of the invention may be seen from an application of the invention to a position indicator system for elevators and for convenience of further description, the invention will be described as applied to such system.

In position indicator systems, a position indicator is usually arranged on the car itself and at the dispatcher's station. In the case of the position indicator on the car, to run separate wires in the travelling cable for each different indication would be undesirable, not only because of the cost but also bcause of the weight added to the cable. It is of advantage to minimize the number of wires used in a system of control between any remote points and particularly in case the wires for the remote control system extend through the travelling cable for the elevator car. A reduction in the number of conducting wires may be effected by utilizing an impulse motor to drive the movable contact of switching mechanism actuated in accordance with car movement, hereinafter referred to as a commutating device, in such manner as to cause current to be transmitted to the proper stationary contacts of the commutating device to effect the desired operations.

The majority of elevator installations do not require more than a certain number, say forty, of stationary contacts on the commutating device for a position indicator system. From a manufacturing standpoint, therefore, it is desirable to adopt as standard a commutating device having, for example, forty stationary contacts. Such device takes care of all elevator installations requiring up to forty stationary contacts. However, there are many elevator installations which have use for more than this number stationary contacts, although the number of such installations is not sufficient to make it advisable to adopt as standard for manufacture a commutating device having this greater number of contacts. On the other hand, to make up special commutating devices for such installations is very expensive. In accordance with the present invention, the commutating mechanism is arranged in one or more decks of commutators, thereby providing mechanism which may be economically manufactured and which is suitable for remote control systems for all present day elevator installations. All decks of commutators are driven by a single impulse motor, this being another feature of the invention.

There are other features and advantages of the invention. These will be apparent from the following description and appended claims.

In the drawings:—

Figure 15:
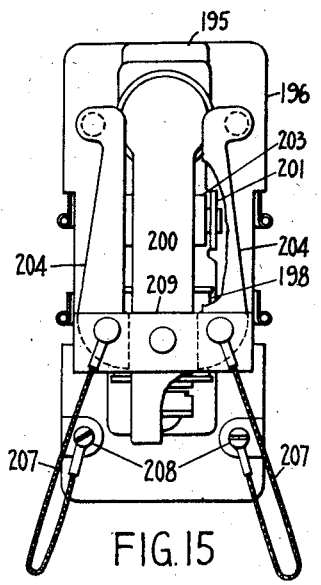
Figure 16:
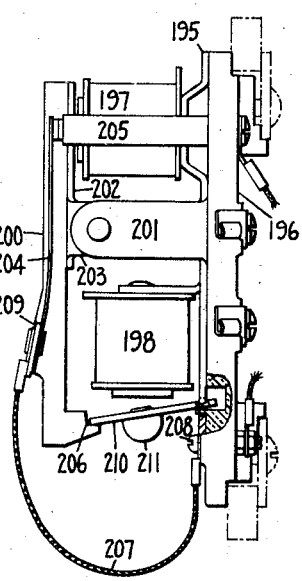
Figure 10:
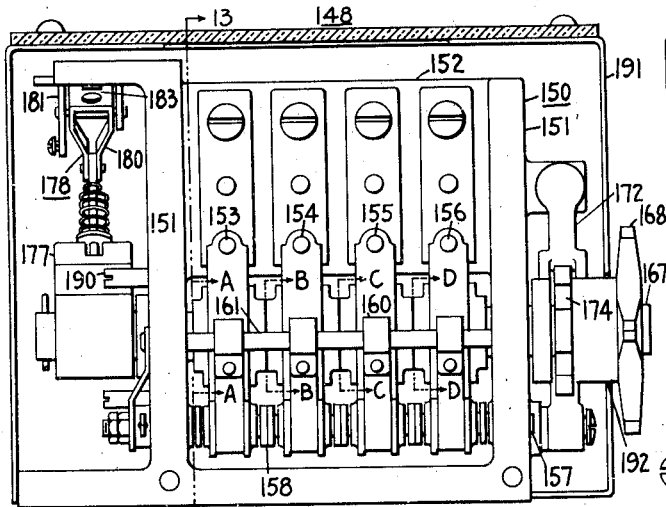
Figure 10 is a side view of a contactor device suitable for controlling the operation of the impulse motor, a portion of the cover of the device being removed.
Figure 11:
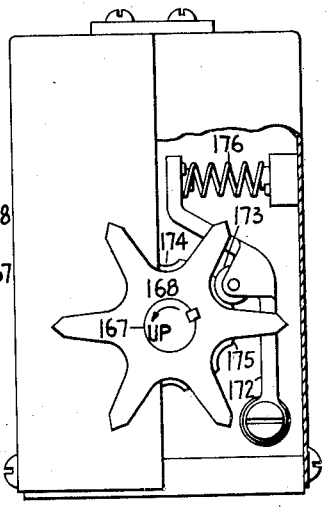
Figure 11 is an end view of the same, with parts broken away.
Figure 14:
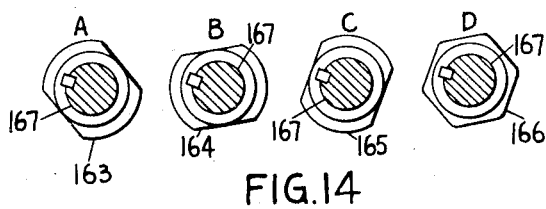
Figure 17:
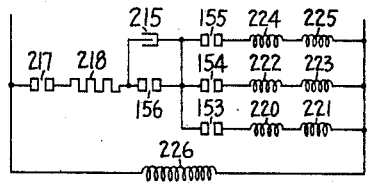
Figure 17:
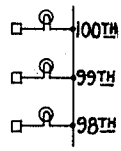
Figure 17:
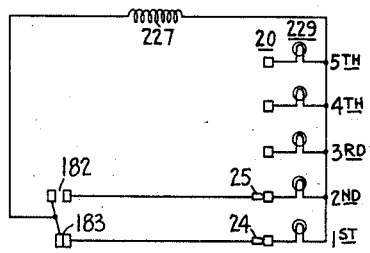
Figure 17:
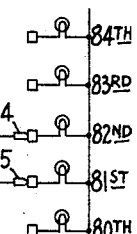
Figure 18:
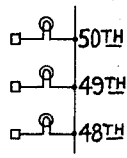
Figure 18:
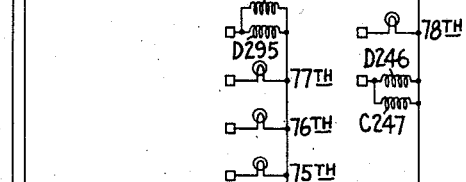
Figure 18:
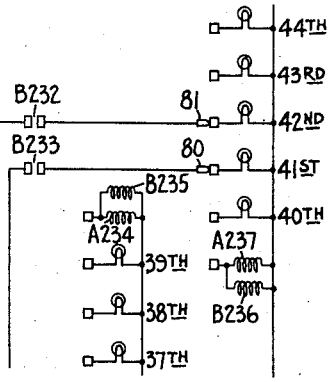
Figure 18:
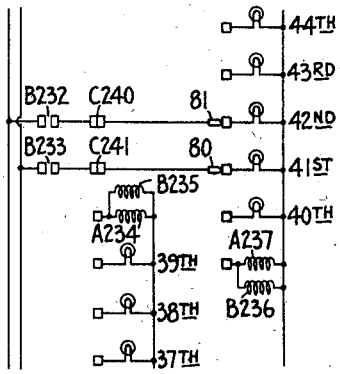
Figure 18:
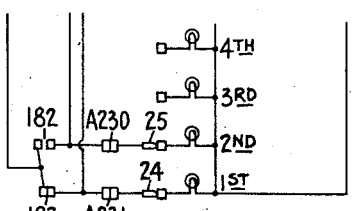
Figure 19:
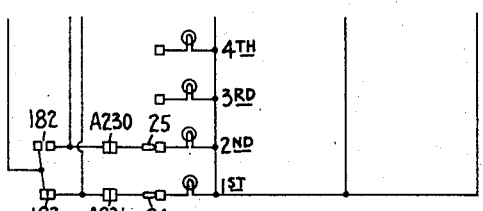

Figure 14 comprises a number of sections, taken along the lines A—A, B—B, C—C and D—D of Figure 10, and shows the relative arrangement of the contactor cams and shaft;

Figure 15 is a front view of a latch switch suitable for use in systems employing commutator mechanism having two or more decks;

Figure 16 is a side view of the same;

Figure 17 is a simplified diagram of position indicator circuits for a five floor installation;

Figure 18 is a simplified diagram of position indicator circuits for a fifty floor installation; and Figure 19 is a simplified diagram of position indicator circuits for a hundred floor installation.

Figure 1:
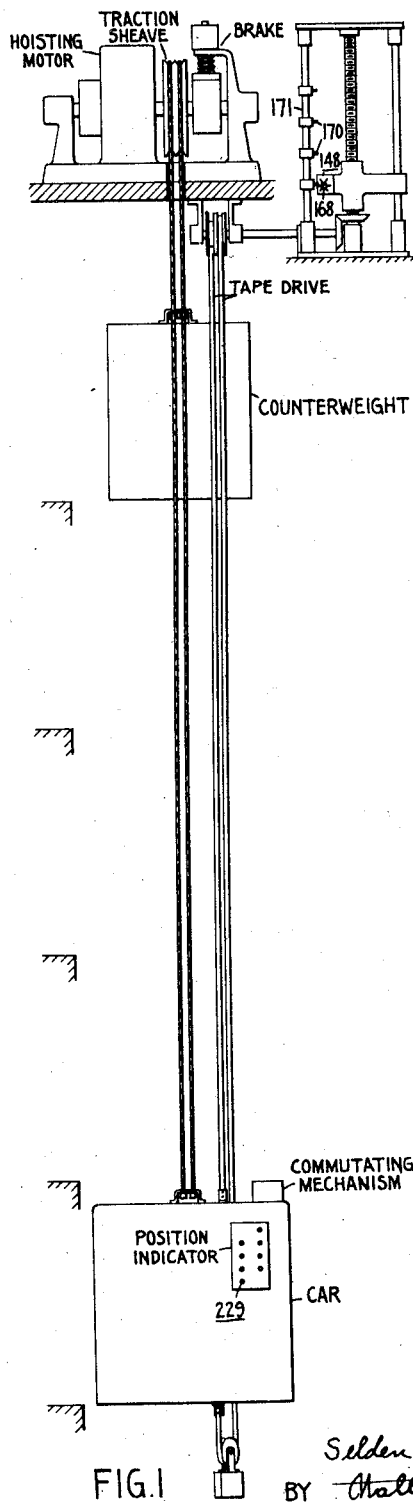
Figure 1 is a simplified schematic representation of an elevator installation in which the elevator car is arranged to serve five floors, illustrating a system for causing the position of the car in the hatchway to be indicated within the car.

For an aid in the understanding of the invention, reference may be had to Figure 1, wherein the various parts of a five floor elevator installation are indicated by legend. The elevator car is raised and lowered by means of a hoisting motor. This motor drives a traction sheave over which pass the hoisting ropes for the car and counterweight. An electromagnetic brake is provided and is applied to effect the final stopping operation and to hold the car when at rest.

The car is illustrated as provided with a position indicator. The operation of the indicator is controlled by impulse motor driven commutating mechanism carried by the car. The impulse motor, in turn, is controlled by mechanism actuated in accordance with car movement. This mechanism is illustrated as arranged in the machine room at the top of the hatchway and may comprise a traveling nut or crosshead driven by a vertical screw. This screw is caused to rotate by tapes, one attached to the top and the other to the bottom of the car. These tapes are wound on overhead sheaves in a manner similar to the winding of measuring tapes, one being wound oppositely with respect to the other. These sheaves drive the vertical screw through bevel gears, the driving being effected by the unwinding of one of the tapes as movement of the car takes place, the other tape being wound up during the driving operation. A contactor device is carried by the crosshead and is arranged to be operated by pins arranged on a vertically extending member of the car actuated mechanism. Each operation of the contactor device causes an impulse of current to be supplied to the impulse motor, causing an operation of the commutating mechanism to take place. This will be explained later in more detail.

Reference may now be had to Figures 2, 3, 4 and 5, which illustrate the details of a single deck motor operated commutating mechanism of preferred construction. This mechanism comprises the commutator proper and the driving mechanism therefor. The commutator has a plurality of stationary contacts arranged in a circle and radially disposed relative to the center. These contacts, designated 20, are secured in slots 21 formed in an insulating base plate 22. The contacts may be secured to the plate in any suitable manner, as by rivets 23 as illustrated. These contacts are engaged by brushes 24 and 25. The brushes are carried by a brush holder 26 mounted for rotation about the center of the circle formed by the contacts. This brush holder is formed with two arms, 27 and 28, brushes 24 and 25 being mounted on arm 27 and being spaced to engage simultaneously adjacent ones of the stationary contacts. Springs 30 are provided for pressing the brushes into engagement with the contacts.

A pair of collector rings 31 and 32 are also mounted on the plate 22 and are concentric with respect to the center for the stationary contacts. These rings are positioned in grooves 33 and are secured therein in any suitable manner, as by screws 34. The other arm 28 of the brush holder carries additional spring pressed brushes 35 and 36 for contacting with rings 31 and 32 respectively.

A conductor 37 connects brushes 35 and 24, while a conductor 38 connects brushes 36 and 25. The collector rings 31 and 32 are connected by conductors 40 with suitable terminals 41 arranged along the margin of plate 22. Thus the collector rings 31 and 32 serve as current feeds for brushes 24 and 25 respectively. The stationary contacts 20 are provided with terminal screws 39 for connecting the contacts in the system.

The brush holder 26 is mounted on a shaft 42 extending through a bearing 43 provided in plate 22. The brush holder is driven by the shaft, being provided with a key 44 which extends through a key-way formed in the shaft. The brush holder is secured to the shaft as by a screw 45. This shaft is in turn driven by the impulse motor through the intermediary of reduction gearing. This reduction gearing comprises pinion gear 46, idler gear 47 and inner toothed gear 48. The pinion gear 46 is secured to the end of armature shaft 50 of the impulse motor, this shaft extending upwardly through plate 51 which forms the top of the housing for the impulse motor. The idler gear 47 is rotatably mounted on a suitable boss formed on plate 51, the pin upon which the gear rotates being secured to the plate as by a nut. Idler gear 47 meshes with the pinion gear 46 and the inner toothed gear 48. Shaft 42 is formed on the inner toothed gear. Brush holder 26 rests upon bearing 43 which extends through a boss 53, formed on the plate, and thus supports gear 48. A suitable spacing washer is provided between the brush holder and the bearing.

Lugs 54 are formed on the bottom of plate 22 to provide the space between the plate and plate 51 required for the reduction gearing. Plate 22 is secured to plate 51 as by screws 55 extending through the spacer lugs.

The impulse motor housing, in addition to the top plate 51, comprises a bottom plate 56 and a circular band 57. The parts of the housing are held in assembled relation by means of screws 58 and positioning pins 60. The impulse motor field structure is illustrated as comprising six poles. These poles, designated 61, are positioned equidistantly around the inside of band 57. Each pole is provided with a field magnet 62. Also, each pole is provided with a comparatively large pole shoe 63 in the form of a rectangular plate, tangentially disposed relative to the impulse motor armature and skewed at an angle of thirty degrees with respect to the armature shaft 50. The dimensions of each shoe are such that one diagonal of its rectangular face is disposed parallel with the armature axis. The band 57, poles 61 and shoes 63 constitute the field structure of the motor.

The armature is formed of a suitable number of laminations 64 which may be punched out of sheet iron or steel. Each finished lamination is in the form of a cross and is pressed on the shaft 50, providing a four pole armature. The armature poles thus formed present long narrow pole faces 65, which are parallel with the armature axis. The armature shaft is rotatably supported by bearings 49 pressed into apertures in plates 51 and 56.

Figure 5:
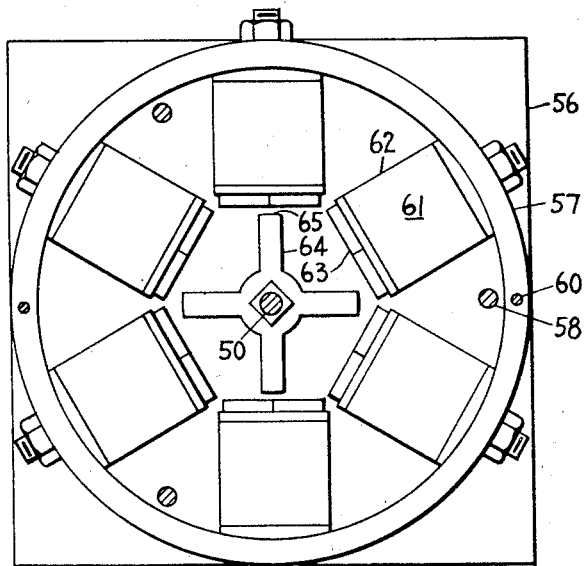
Figure 5 is a view in section, taken along the line 5—5 of Figure 2, illustrating the impulse motor.

In the above construction, the armature poles are caused to have very definite positions with respect to the field poles. Assume, for example, that the coils of the top and bottom field poles, as viewed in Figure 5, are energized. Under such conditions, the armature assumes the illustrated position with the longitudinal centerlines of two armature pole faces 65 directly aligned with the diagonals joining opposite corners of the top and bottom field pole shoes 63. Similarly the energization of the coils of the other pairs of oppositely arranged field poles causes the armature to assume positions in which the longitudinal centerlines of two of its diametrically opposite pole faces are in direct alignment with the diagonals of opposed field pole faces.

In each of these positions the magnetic reluctance between the field and armature poles is at a minimum for two reasons: first, because a maximum area of the faces of the field poles is opposed to the faces 65 of the armature poles, and second, because the air gaps between the tangentially disposed field pole faces and armature pole faces are, in this position, reduced to a minimum. This gives a very definite locking position since movement of the armature poles to either side of the locking position reduces the iron path available to the flux threading between the field and armature poles and at the same time increases the length of the air gap between said poles.

The skewed arrangement of the field pole shoes also allows the use of large-areaed, closely-spaced, shoes to effect a strong starting torque for rotating the armature to a succeeding position in either direction. Furthermore, the strong starting torque is obtained without causing excessive magnetic leakage between adjacent shoes, since essentially parallel surfaces are presented to one another and the points or corners of one shoe are widely separated from those of adjacent shoes.

It is preferred to provide braking mechanism to produce a frictional drag on the armature shaft 50 and on the gear 48 to cause the armature poles to stop in locking positions without oscillation or vibration. Such braking mechanism, designated as a whole as 66, is illustrated. In the arrangement shown, two brake arms 67 are provided and are positioned one on each side of the armature shaft 50. The brake arms 67 are pivotally mounted at intermediate points on screws 70 secured to the top plate 51. A spring 68 arranged between the outer ends of the arms, biases them into engagement with the hub of pinion gear 46.

Additional braking mechanism may be provided. Such braking mechanism is illustrated and is designated as a whole as 71. It is shown in the form of diametrically opposed spring pressed plungers 72, engaging the outer periphery of inner toothed gear 48 and mounted in guides 73. These guides are secured to the lugs 54 depending from plate 22. Braking mechanism 71, in addition to assisting braking mechanism 66 in preventing vibration, causes the back lash of gears 46, 47 and 48 to be taken up. Other forms of braking mechanism may be employed, if desired.

Diametrically opposed magnet coils 62 may be connected either in parallel or in series. Also, the opposed coils are oppositely wound so that their energization produces magnetic poles of opposite polarity. As oppositely disposed magnets are energized, the pair of armature poles separated therefrom by the least angle moves into a position in alignment with the energized magnets. With the three pairs of magnets successively energized in one direction around the band 57, the armature rotates in the opposite direction in steps of thirty degrees each. At the completion of each step, two oppositely disposed armature poles are in alignment with two oppositely disposed field poles so that each locking position is equally definite.

Each step of rotation of the impulse motor armature is transmitted to the brush holder through the reduction gearing. The amount of reduction is such that each step of armature movement causes each of the brushes 24 and 25 to move into engagement with the next stationary contact. The direction of movement of the brush holder is opposite to that of the armature owing to the gearing.

Figure 3:
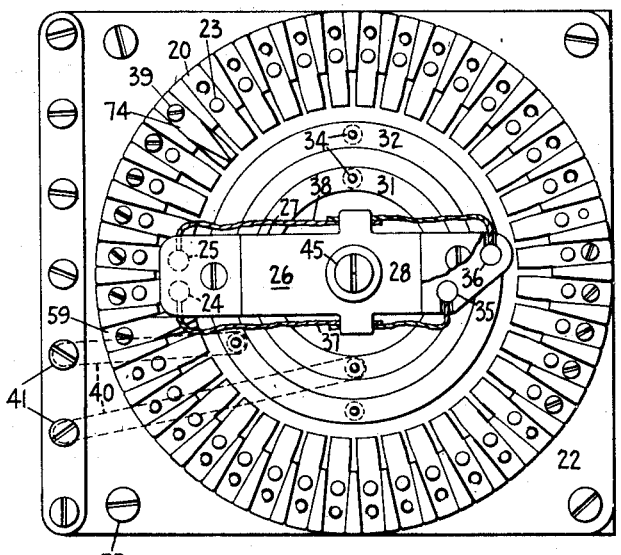
Figure 3 is a top view of the same.
Figure 2:
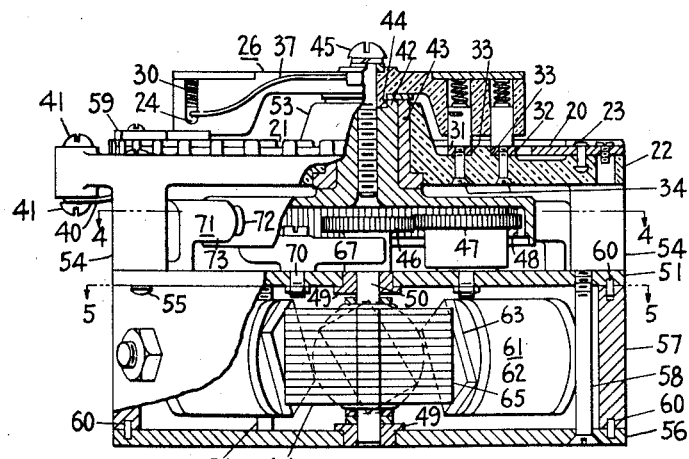
Figure 2 is a side view, with parts broken away, of commutator mechanism having only one commutator deck.
Figure 4:
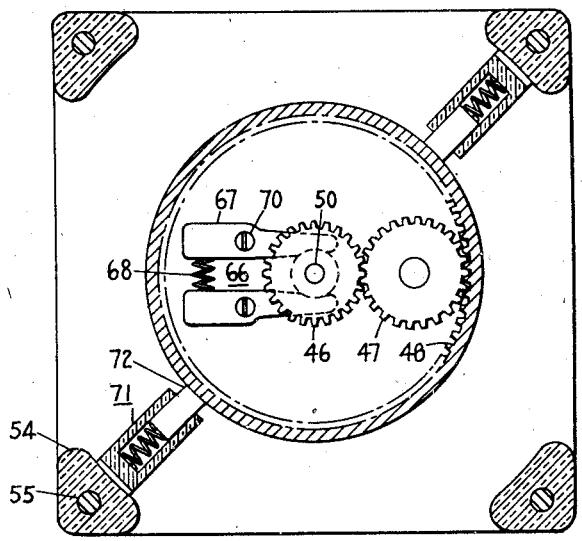
Figure 4 is a sectional view of the same taken along the line 4—4 of Figure 2, illustrating the driving gear between the commutator and the impulse motor.

The commutator has been illustrated as provided with forty stationary contacts. Such arrangements is sufficient to take care of all installations where forty or less operations are desired. It is preferred, however, to provide correcting mechanism to insure that the mechanism is maintained in step with the elevator car. In systems for indicating the position of the elevator car, the correcting mechanism is preferably arranged to be effective at the terminal floors. Correcting mechanism is shown in Figures 2 and 3 wherein it is set for a position indicator system for five floors to correspond with Figure 1. This mechanism comprises a pair of stop members 59 and 74, the former positioned on top of the contact next below the one for the first floor and the latter on top of the contact next above the one for the fifth floor. The stop members are secured to the contacts by screws extending into the threaded apertures provided in the contacts for the terminal screws. If the commutator gets out of step, the brush holder engages the one or the other of the stop members when the car reaches the corresponding terminal floor to bring the commutator back in step. If the brush holders get behind the car during up car travel, they will be ahead of the car upon reversal and during the succeeding down car travel, and the correction is made at the bottom terminal, while if they get behind during down car travel, they will be ahead of the car upon reversal and during the succeeding up car travel, and the correction is made at the top terminal. In installations having more than five floors, stop member 74 is positioned on top of the contact next above the one for the upper terminal floor. By utilizing the single stop member 59 for correction for both terminal floors, thirty-nine effective stationary contacts are provided, thus taking care of a position indicator system, for example, in which it is desired to show the position of the car with respect to thirty-nine floors.

Figure 7:
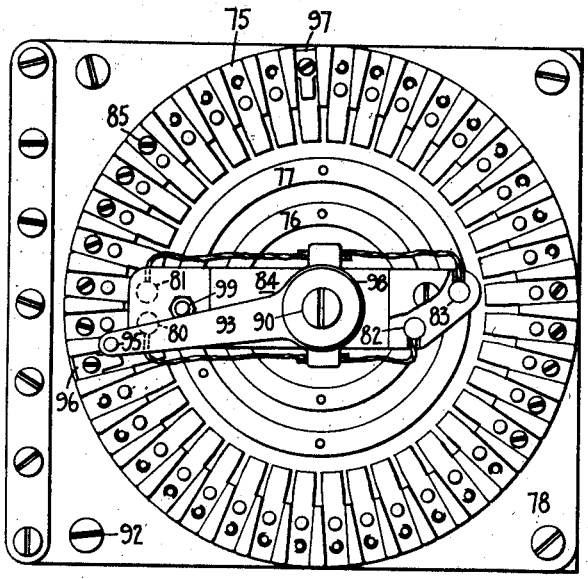
Figure 7 is a top view of the same.
Figure 6:
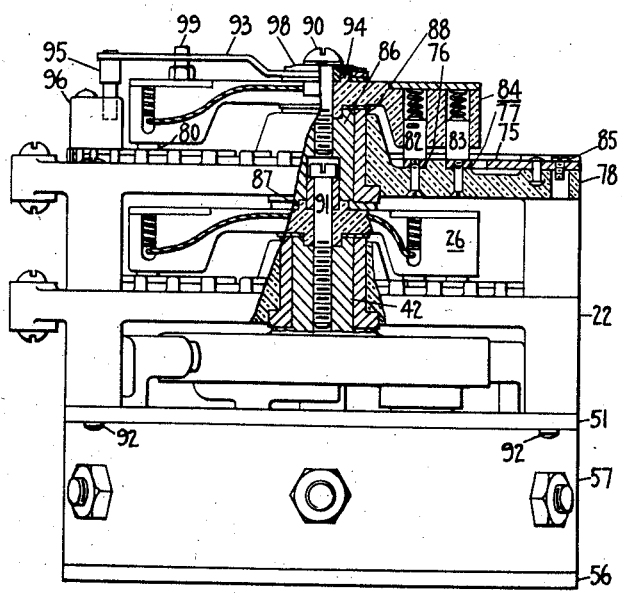
Figure 6 is a side view, with parts broken away, of commutator mechanism having two decks of commutators for use in systems in which more commutator contacts are required than are provided by the single deck commutator.

When more stationary contacts are required, a second commutator deck is added to the mechanism above described. Such arrangement is illustrated in Figures 6 and 7. The added commutator deck is of the same construction as the one described for the single deck commutating mechanism. It comprises a plurality of stationary contacts 75 and collector rings 76 and 77 secured to insulating base plate 78. Contacts 75 are engaged by brushes 80 and 81, while collector rings 76 and 77 are engaged by brushes 82 and 83. These brushes are carried by brush holder 84. Brushes 80 and 82 are connected together, as are brushes 81 and 83. The collector rings are connected to terminals along the margin of plate 78. Terminal screws 85 are provided for connecting the stationary contacts 75 in the system.

The brush holder 84 is driven by a stub shaft 86, in turn driven by the brush holder 26 for the lower commutator deck, brush holder 26 being driven by the impulse motor through the reduction gearing as previously described. The driving relation between the brush holder 26 and stub shaft 86 is obtained by a key and key-way construction as indicated at 87. The stub shaft is rotatably mounted in a bearing 88 secured in plate 78. A screw 90 secures brush holder 84 to shaft 86 while a screw 91 secures brush holder 26 to shaft 42. With this arrangement, the brush holders are driven in synchronism, the brushes of each brush holder being moved into engagement with the next stationary contact upon each step of rotative movement of the impulse motor. The commutating decks are secured to the impulse motor housing by means of elongated screws 92 which extend through the spacer lugs depending from the bottoms of plates 78 and 22.

In the double deck commutator arrangement, the correcting mechanism is omitted from the lower deck and correcting mechanism of modified construction is provided for the upper deck. This correcting mechanism comprises an arm 93 provided with an aperture into which a hub 94 formed on brush holder 84 extends. A stop pin 95 is secured in the end of arm 93 for cooperation with stops 96 and 97 mounted on plate 78 on top of certain ones of stationary contacts 75. Stop 97 is positioned over the stationary contact next above the one for the upper terminal, while stop 96 is positioned over the stationary contact next below the upper deck contact which is in vertical alignment with the stationary contact of the lower commutator for the lower terminal. The arm 93 is caused to rotate with the brush holder through the intermediary of a friction washer 98.

Assuming that the car is positioned at the lower terminal, the parts being illustrated for this position in Figures 6 and 7, upon clockwise rotative movement of the brush holders by the impulse motor as the car moves in the up direction, arm 93 is moved therewith through the intermediary of the spring washer 97. The arm is brought to a stop upon engagement of stop pin 95 with stop 97. The brush holders, however, continue their rotative movement as movement of the car continues, slipping occurring between arm 93 and the spring washer. The brush holders make almost a complete revolution after the arm is stopped before the car reaches the upper terminal floor. As the car reaches the upper terminal, a stop 99 on brush holder 84 engages arm 93 to bring the brush holders to a stop. A similar operation takes place during down car travel, arm 93 moving initially with brush holder 84 and coming to a stop upon stop pin 95 engaging stop 96. The brush holders are thereafter brought to a stop upon engagement of stop 99 with the arm as the car arrives at the lower terminal floor. If the commutator gets out of step, the stop 99 on brush holder 84 engages correcting arm 93 at one or the other of the terminal floors to bring the commutator brush holders back in step. If the brush holders get behind the car during up car travel, they will be ahead of the car upon reversal and during the succeeding down car travel, and the correction is made at the lower terminal, while if they get behind the car during down car travel, they will be ahead of the car upon reversal and during the succeeding up car travel, and the correction is made at the upper terminal.

In Figure 7, the correcting mechanism is set for a position indicator system for fifty floors to correspond with the wiring diagram for a double deck commutator to be described later. With forty contacts on the lower deck commutator, stop 97 is secured on top of the contact next above the one on the upper commuator, which is in vertical alignment with the one for the tenth floor on the lower commutator. In the installations of other numbers of floors, the stop 97 is positioned on the top of the contact next above the one in vertical alignment with the commutator contact of the lower deck for the floor of a number equal to the total number of floors minus forty. With this arrangement, seventy-eight effective stationary contacts are provided, thus taking care of position indicator systems in which it is desired to show the position of the car with respect to seventy-eight floors.

Figure 9:
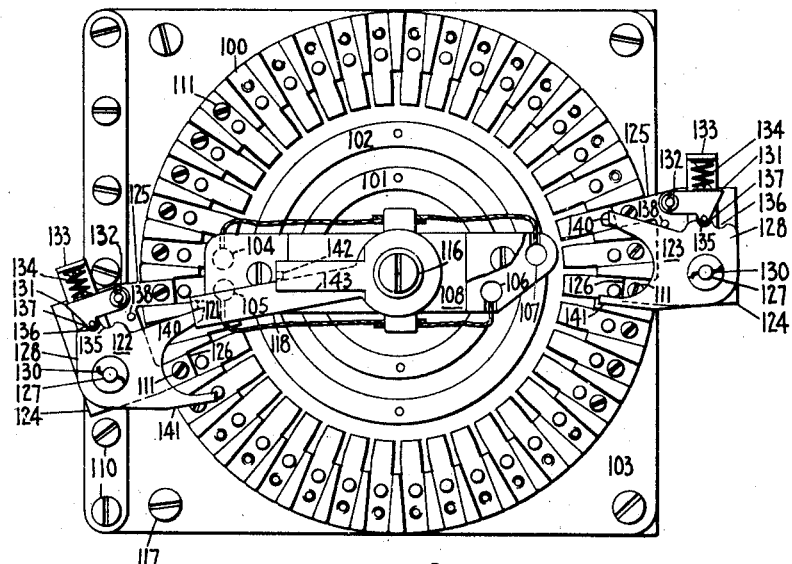
Figure 9 is a top view of the same.
Figure 8:
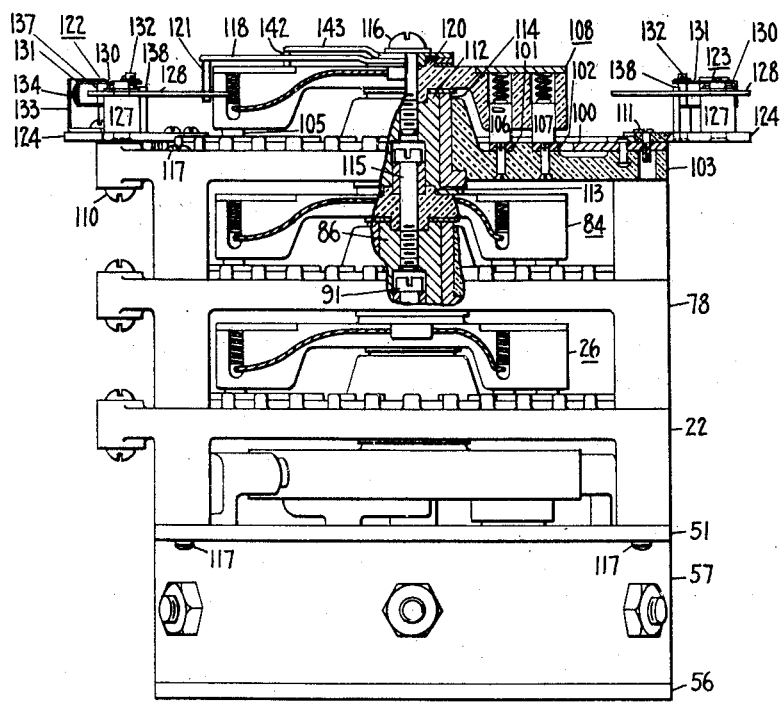
Figure 8 is a side view, with parts broken away, of commutator mechanism having three decks of commutators for use in systems in which more commutator contacts are required than are provided by the double deck commutator.

If more stationary contacts are required, a third commutator deck is added to the double deck commutator above described. Such arrangement is illustrated in Figures 8 and 9. The added commutator deck is of the same construction as that described for the single and double deck commutator mechanisms. It comprises a plurality of stationary contacts 100 and collector rings 101 and 102 secured to insulating base 103. Contacts 100 are engaged by brushes 104 and 105, while collector rings 101 and 102 are engaged by brushes 106 and 107. These brushes are carried by brush holder 108. Brushes 104 and 107 are connected together as are brushes 105 and 106. The collector rings are connected to terminals 110 along the margin of plate 103. Terminal screws 111 are provided for connecting the stationary contacts 100 in the system.

Brush holder 108 is driven by a stub shaft 112 in the same manner as brush holder 84 for the intermediate commutator deck, brush holder 84 being driven by the impulse motor through the intermediary of brush holder 26 and reduction gearing as previously described. The driving relation between brush holder 84 and shaft 112 is obtained by a key and key-way construction, as before, as indicated at 113. The stub shaft is rotatably mounted in a bearing 114 secured in plate 103. A screw 115 secures brush holder 84 to stub shaft 86 in the same manner as screw 91 secures brush holder 26 to shaft 42 in the double deck construction. A screw 116 secures brush holder 108 to shaft 112 in the same manner as screw 90 secures brush holder 84 to shaft 86 in the double deck construction. With this arrangement, the brush holders are driven in synchronism, the brushes of each brush holder being moved into engagement with the next stationary contact upon each step of rotative movement of the impulse motor. The commutating decks are secured to the impulse motor housing by means of elongated screws 117 which extend through the spacer lugs depending from the bottoms of plates 22, 78 and 103.

In the triple deck commutator arrangement, the correcting mechanism is omitted from the lower and intermediate decks and correcting mechanism of modified construction is provided on the top deck. This correcting mechanism comprises a correcting arm 118 provided with an aperture into which a hub 120 formed on brush holder 108 extends. A stop pin 121 is formed on the end of the correcting arm for cooperating with stops, designated as a whole as 122 and 123, mounted on plate 103 and secured thereto by means of screws 111 for certain of the stationary contacts 100. These stops 122 and 123 are of reverse construction but are otherwise the same so that the details of construction of but one of them will be described.

The stop comprises a base 124 of insulating material formed with prongs 125 and 126 arranged to extend over spaced stationary contacts 100. Apertures are provided in these prongs through which screws 111 pass to secure the stop to plate 103. A post 127 is secured to and extends upwardly from plate 124 and forms a pivot for a rocker 128 held in place thereon as by a pin 130. This rocker is provided with a spring pressed positioning pawl 131 pivotally mounted on a post 132 secured to plate 124. A bracket 133 is secured to plate 124 and the spring 134 for the pawl extends between seats formed on the bracket and the pawl. The rocker is formed with notches 135 and 136 into which the roller 137 of the positioning pawl extends. A pin 138 extending upwardly from plate 124 forms a stop to limit rotative movement of the rocker in one direction about its pivot, while the pawl roller in depression 136 forms a stop to limit rotative movement of the rocker in the other direction about its pivot, this being due to the increased distance of that part of the rocker immediately beyond the depression 136 from the pivot post 127. The rocker is formed with two fingers 140 and 141 which extend inwardly into the path of movement of stop pin 121 on correcting arm 118, to be engaged thereby and moved about its pivot post as rotative movement of the correcting arm takes place.

The correcting mechanism is set for a position indicator system for one hundred floors, to correspond with the wiring diagram for a triple deck commutator to be described later. Prong 125 of stop 122 is secured at the top of the third deck stationary contact in vertical alignment with the one for the first floor on the first deck, with prong 126 of that stop secured on top of the third deck stationary contact for two floors below. Prong 125 for stop 123 is secured on top of the third deck stationary contact in vertical alignment with the one for the twentieth floor on the first deck, and prong 126 is secured on top of the third deck stationary contact for two floors above. In installations for other numbers of floors, the stop 123 is positioned so that its prong 125 is secured on top of the third deck stationary contact in vertical alignment with the contact of the first deck for the floor of a number equal to the total number of floors minus eighty. With this arrangement, one hundred and twelve effective stationary contacts are provided, thus taking care of position indicating systems in which it is desired to show the position of the car with respect to one hundred and twelve floors.

Assuming that the car is positioned at the lower terminal, the parts being illustrated for this position in Figures 8 and 9, upon clockwise rotative movement of the brush holders by the impulse motor as the car moves in the up direction, arm 118 is moved therewith by friction. It clears finger 140 of stop 123 but engages finger 141 of stop 123 to move the rocker counterclockwise about its pivot to a position with roller 137 in depression 136. In this position, arm 118 is free to pass finger 141. Upon continued rotative movement of the brush holders, arm 118 passes finger 141 of stop 122 but engages finger 140 of the stop to move the rocker counterclockwise about its pivot into position with the roller 137 in depression 135. In this position of the rocker, arm 118 is free to pass finger 140. Upon continued rotative movement of the brush holders, arm 118 engages finger 140 of stop 123 where it is brought to a stop. The brush holders, however, continue their rotative movement as movement of the car continues, slipping occurring between arm 118 and brush holder 108. The brush holders make almost a complete revolution after arm 118 is stopped before the car reaches the upper terminal floor. As the car reaches this terminal, a stop 142 on an arm 143 keyed to the brush holder engages correcting arm 118 to bring the brush holders to a stop.

A similar operation takes place during down car travel, correcting arm 118 moving initially with the brush holders, moving the rocker of stop 122 back into its former position upon stop pin 121 engaging finger 141, moving the rocker of stop 123 back into its former position upon the engagement of stop pin 121 with finger 140, and finally being brought to a stop upon the engagement of stop pin 121 with finger 140 of stop 122. The brush holders continue their rotative movement after arm 118 is stopped, and are finally brought to a stop upon the engagement of stop 142 with arm 118 as the car arrives at the lower terminal floor.

If the commutator gets out of step, stop 142 engages correcting arm 118 at one or the other of the terminal floors to bring the commutator brush holders back in step. If the brush holders get behind the car during up car travel, they will be ahead of the car upon reversal and, during the succeeding down car travel, and the correction is made at the bottom terminal, while if they get behind the car during down car travel, they will be ahead of the car upon reversal and during the succeeding up car travel, and the correction is made at the upper terminal.

The impulses from a source of current to the impulse motor to operate the commutating mechanism are transmitted through contactor device 148. The details of a preferred form of contactor device are illustrated in Figures 10, 11, 12, 13 and 14. The device comprises a frame 150 of insulating material which is of a channel shape, with the flange portions 151 connected by a cross member 152. The stationary contacts of four cam operated switches 153, 154, 155 and 156 are mounted on the cross member 152. The movable contacts of these switches are pivotally mounted on a contact rod 157 extending between flange portions 151. These movable contacts are equally spaced by positioning collars 158 on rod 157, the stationary contacts being correspondingly equally spaced, as illustrated in Figure 10. Each movable contact is biased toward its corresponding stationary contact by a spring 160. The arrangement for switch 153 is shown in Figure 13. The movable contacts are electrically connected by the rod 157 and by the rod 161 extending behind the biasing springs, while the stationary contacts are insulated from each other and provided with separate connecting screws 162.

The operating cams 163, 164, 165, 166 for the switches are keyed on a shaft 167 rotatably mounted in flange portions 151. Cam 166 is hexagonal in form. Cams 163, 164 and 165 are each formed with flat portions one hundred and eighty degrees apart, and at equal, but slightly less distance from the center of the cam than the flats of cam 166. Cams 163, 164 and 165 are each arranged on shaft 167 so that its flats are parallel to two flats of cam 166, but at an angle to the flats of each of the other cams (see Figure 14). Since the flats of cam 166 are farther from shaft center than the flats of the other cams, cam 166 causes switch 156 to close after and open before each of the other switches.

Rotative movement is imparted to shaft 167 to effect the operation of these switches by means of a star wheel 168 keyed on the outer end of the shaft. The contactor device, as previously stated, is mounted on the cross head of the car actuated mechanism. The stationary pins for operating the contactor device are shown in Figure 1 where they are designated 170. They are arranged on vertically extending member 171 of the car actuated mechanism in position to engage the points of the star wheel 168 as movement of the cross head takes place. Figure 1 illustrates only a five floor installation and can serve only as an aid in the understanding of the invention. In case of a single deck commutating mechanism, the number of pins is one less than the number of operative positions assumed by the brush holder. In case of multi-deck commutating mechanism, the number of pins is one less than the combined number of effective operative positions assumed by the brush holders. Thus, for the position indicator system in Figure 1, for example, only four pins are provided. The pins are positioned to cause operation of the star wheel at desired points in the travel of the car. The star wheel, upon engaging each pin during travel of the car, is moved thereby, as continued movement of the car takes place, to cause sixty degrees of rotative movement of shaft 167.

With the car stopped at any floor, cam 166 of the contactor device is in such position as to cause switch 156 to be open. The parts of the contactor device have been illustrated in Figures 13 and 14 for this condition. With the cams in the position illustrated in Figure 14, switches 153 and 155 are closed and switches 154 and 156 are open. Assume that the elevator car is started in the up direction. As this takes place, a point is reached at which a point of the star wheel engages one of the pins 170. This causes counterclockwise rotative movement of shaft 167, as viewed in Figure 11, and clockwise rotative movement of the cams, as viewed in Figure 14. Cam 165 opens switch 155. Immediately thereafter, cam 166 permits the closing of switch 156. Upon continued rotative movement of the star wheel, cam 166 reopens switch 156 and immediately thereafter cam 164 permits the closing of switch 154. This occurs at the end of the sixty degree rotative movement of the star wheel. Continued movement of the cross head results in the star wheel engaging another one of the pins 170, and this causes further clockwise rotative movement of the cams. As this movement takes place, cam 163 causes the opening of switch 153. Immediately thereafter cam 166 permits the closing of switch 156. Further rotative movement of the star wheel results in the opening of switch 156 by cam 166, and finally the closing of switch 155 by cam 165. A similar operation takes place upon further sixty degree rotative movement of the star wheel, namely, the opening of switch 154 by cam 164, the closing of switch 156 by cam 166, the opening of switch 156 by cam 166, and finally the closing of switch 153 by cam 163.

It is to be noted that, with the above arrangement, switch 156 and one of switches 153, 154 and 155 are closed at the same time during each sixty degree rotative movement of the star wheel. During up car travel, switches 153, 154 and 155 are closed in sequence in the order named. During down car travel, however, reverse operation takes place and these switches are closed in sequence in the order 155, 154 and 153. It is also to be noted that switch 156 closes after and opens prior to the closing and opening of each of these other switches. From a consideration of the circuits in which these switches are employed, to be described later, it will be seen that switch 156 serves as a master switch for the other switches.

Positioning mechanism is provided for causing shaft 167 to assume definite positive positions upon each step of rotative movement. This mechanism consists of a pivoted arm 172 provided with a roller 173 for cooperating with depressions 174 formed in a rim 175 on the star wheel 168. Spring 176 biases the arm in a direction to move the roller 173 into a depression. This mechanism not only assures correct positioning of shaft 167 but also assists in effecting the latter portion of each step of rotative movement of the star wheel.

On the other end of shaft 167 is mounted an operating member 177 for switching mechanism, designated as a whole as 178. This mechanism comprises a metallic switch lever 180, pivoted on a bracket 181 secured to an extension from the flange portion 151. This lever is provided with contacts for engaging stationary contacts mounted on the insulating extension piece. These cooperating contacts form switches, designated 182 and 183. A toggle link 184 is pivoted to the lever 180 and extends into an opening formed in operating member 177. A compression spring 185 surrounds the toggle link. At one end, this spring presses against a shoulder on the toggle link and at the other end it presses against the operating member through the intermediary of a washer 186. The operating member is provided with a block 187 which is spring pressed against shaft 167 to provide a frictional drive for the member. Terminals 188 are provided on cross member 152 for this switching mechanism.

Figure 12:
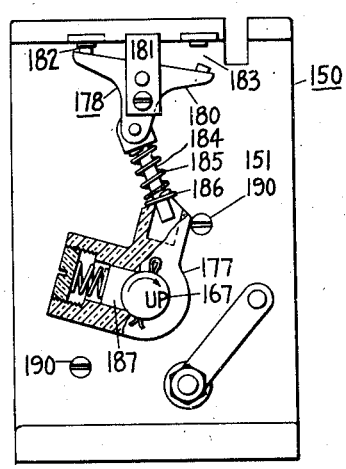
Figure 12 is a view of the other end of the contactor device, with the cover removed and with parts shown in section.
Figure 13:
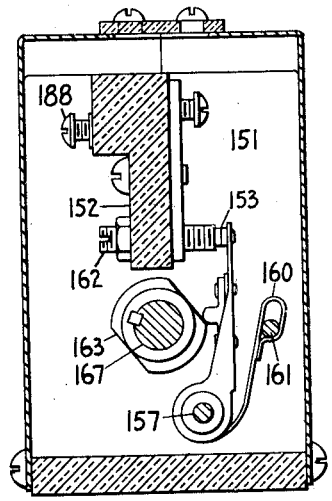
Figure 13 is a view in section taken along the line 13—13 of Figure 10.

Counterclockwise movement of shaft 167, as viewed in Figure 12, causes counterclockwise movement of operating member 177. This causes the toggle link 184 to be gradually displaced until a point is finally reached where the lever 180 is forced to its other position with a snap action, causing the opening of switch 182 and the closing of switch 183. Similar action takes place upon reverse rotative movement of shaft 167. Stops 190 are provided for operating member 177 to permit continued rotative movement of shaft 167 without further effect upon the switching mechanism. The contactor device is provided with a suitable cover 191 having an opening 192 through which the star wheel 168 extends.

Before proceeding with the description of operation of the position indicating mechanism, reference will be had to Figures 15 and 16 which illustrate in somewhat simplified form the details of a latch switch utilized in effecting the transfer of circuits from one commutator deck to another. Although other forms of switches may be employed, the one illustrated is considered suitable in view of its simplicity. It comprises two electromagnets mounted at right angles on a frame 195 secured to an insulating base 196. The upper of these electromagnets, designated 197, serves as the operating magnet, while the lower one, designated 198, serves as a restoring magnet. A latch lever 200 of insulating material is pivotally mounted between two arms 201 formed on the frame 195. An armature 202 for the operating magnet is secured to the upper end of the latch lever and is formed with flanges 203 which form the pivotal support for the lever. An insulating plate 209 is secured to the latch lever, as by a rivet, near its lower end. This plate extends crosswise of the lever and has a contact spring 204 secured to each end thereof. These contact springs extend upwardly from plate 209 for cooperation with stationary contacts 205 secured to the base 196. Each contact spring is connected by a flexible conductor 207 to a terminal 208 secured to the base 196. At its lower end, the latch lever 200 is formed with a latch portion 206 for cooperating with the armature 210 for the restoring magnet 198.

This armature is pivotally secured to the frame and is biased for counterclockwise movement, as viewed in Figure 16, as by weight 211.

The switch is illustrated in latched position. Upon energization of the restoring magnet 198, its armature 210 is pulled upwardly, releasing the latch and permitting the latch lever to move counterclockwise about its pivot under the influence of gravity, assisted initially by the contact springs 204. This results in the disengagement of the contact springs from their stationary contacts. Upon energization of the operating magnet 197, the armature 202 on the latch lever pulls the lever clockwise about its pivot, causing the re-engagement of the contact springs with the stationary contacts, and permitting the reset armature 210 to drop into position to latch the contact springs 204 in engaging position.

Reference may now be had to Figure 17, which illustrates, in simplified form, the circuits for the impulse motor and position indicator circuits for a five floor elevator installation in which single deck commutating mechanism is employed. The switches of the contactor device are arranged in the circuits for the coils for the field magnets of the impulse motor. For convenience, the coils of the field magnets of the impulse motor are given different reference numerals on the diagram, referred to later. A condenser 215 is connected across switch 156 of the contactor device to prevent arcing. A switch 217, arranged in the control circuits so as to be closed only when the car is in operation, as by having its operating coil subject to contacts on the elevator motor brake so as to be energized when the brake is lifted and the car is in operation, may be arranged in the circuit for the field coils of the impulse motor. This insures deenergization of the field coils when the car is stopped, permitting these coils to be designed for intermittent duty.

Assume that the car is moving in the up direction, and that the operation of the star wheel causes switches 153 and 156 to be closed. This completes a circuit through resistance 218 for the oppositely disposed impulse motor field coils 220 and 221. This results in one step of rotative movement of the armature of the impulse motor. The circuit for these coils is broken upon the subsequent opening of master switch 156. Upon the next step of sixty degree rotative movement of the star wheel, switches 156 and 154 are closed, resulting in the energization of oppositely disposed impulse motor field coils 222 and 223, causing another step of rotative movement of the impulse motor armature. The circuit for these field coils is thereafter broken by the opening of master switch 156. The next step of sixty degree rotative movement of the star wheel causes switches 156 and 155 to be closed. This causes energization of oppositely disposed impulse motor field coils 224 and 225, causing another step of rotative movement of the impulse motor armature. The circuit for these field coils is subsequently broken by the opening of master switch 156. This operation is repeated upon continued rotative steps of the star wheel.

The operation is similar during downward movement of the elevator car, with the exception that the field coils of the impulse motor are energized in such sequence as to cause opposite rotative movement of the impulse motor armature, the switches of the contactor device being closed in the order 155, 154 and 153. Upon the movement of the elevator car being reversed, the last of these switches to be closed before reversal takes place is reclosed upon the first step of rotative movement of the star wheel in the reverse direction. The same field coils of the impulse motor are energized so that no movement of the impulse motor armature takes place. The next operation of the star wheel, however, causes the closing of next to the last of these switches to be closed before reversal took place, causing energization of the field coils to effect a step of rotative movement of the impulse motor armature in the reverse direction. With the above described arrangement, all the makes and breaks for the impulse motor field coils are effected by master switch 156. Thus, the single condenser 215 is effective to eliminate arcing.

The rotative movement of the impulse motor armature, as the impulses of current are supplied to the field coils, causes rotative movement of the brush holder to effect the proper lighting of the lamps 230 of the position indicator. The current for the indicator lamps is supplied from a low voltage source illustrated as a transformer having primary and secondary windings 226 and 227 respectively. The stationary contacts of the commutating mechanism are shown developed in a straight line. Assume that the car is positioned at the lower terminal. Under such conditions, commutator brushes 24 and 25 are in engagement with the stationary contacts 20 for the first and second floors, the floor numbers being indicated to the right of the lamps, and toggle switch 183 is closed and toggle switch 182 is open, rendering brush 24 "alive" and brush 25 "dead." Thus, a circuit is completed for the position indicator lamp 230 for the first floor by way of switch 183 and brush 24. Upon the car being started in the up direction, a point is reached which causes the operation of the star wheel. This results in the closing of switch 156 and the switch which was closed during downward movement of the car from the second to the first floor. Thus the same field coils of the impulse motor are reenergized and no movement of the brushes takes place. However, the movement of shaft 167 of the contactor device causes the opening of toggle switch 183 and the closing of toggle switch 182. This renders brush 24 "dead" and brush 25 "alive", thus breaking the circuit for the position indicator lamp for the first floor and completing a circuit for the position indicator lamp for the second floor. As the car moves from the second to the third floor, the next step of rotative movement of the star wheel causes switches to be closed to effect movement of brush 25 into engagement with the stationary contact 20 for the third floor, thereby breaking the circuit for the second floor position indicator lamp and completing the circuit for the third floor position indicator lamp. Upon the next step of rotative movement of the impulse motor, brush 25 is moved into engagement with the contact for the fourth floor, causing the lighting of the fourth floor position indicator lamp, and as the car runs from the fourth to the fifth floor, the next step of rotative movement of the impulse motor moves brush 25 into engagement with the fifth floor stationary contact to cause the lighting of the fifth floor position indicator lamp. Upon reverse rotative movement of shaft 167 as the car moves from the fifth to the fourth floor, no movement of the brushes takes place, the shift from the fifth floor to the fourth floor position indicator lamp being effected by the opening of toggle switch 182 and the closing of toggle switch 183 to render brush 24 "alive" and brush 25 "dead". Brush 24 is shifted one contact in the reverse direction upon each succeeding step of rotative movement of the star wheel, causing the lighting of the proper position indicator lamps as the car moves down the hatchway.

Similar operation is had where double deck commutating mechanism is employed, the circuits for a fifty floor installation being illustrated in Figure 18. The circuits for the impulse motor field coils are not illustrated in this figure as they remain the same. The stationary contacts of each commutating deck are shown developed in a straight line to simplify the diagram. Two of the latching switches are employed in these circuits, one for transferring from the first to the second commutator deck and the other for transferring from the second to the first commutator deck. The coils and contacts of these switches are separated in the interest of simplifying the diagram, the parts of the switches being designated generally by letters in addition to the usual reference numerals, in order that these parts may be tied together. The switch for transferring the circuits from the second commutator deck to the first is designated by reference letter A, while the switch for transferring the circuits from the first commutator deck to the second is designated by the reference letter B. In view of the fact that two switches are employed, the contacts of each switch formed by the stationary contacts and cooperating contact springs have been given different reference numerals. Similarly, the coils of the electromagnets have been given different reference numerals.

Assume, as before, that the car is positioned at the lower terminal. The first deck commutator switch contacts A230 and A231 are in engagement and the second deck commutator switch contacts B232 and B233 are separated under such conditions. Toggle switch 182 is open and toggle switch 183 is closed, as before. Thus first deck commutator brush 24 is "alive" and first deck brush 25 and second deck brushes 80 and 81 are "dead". With brush 24 "alive", a circuit is completed for the position indicator lamp for the first floor and this lamp is lighted. The first step of rotative movement of the star wheel, as the car moves from the first to the second floor, effects the opening of switch 183 and closing of switch 182, rendering brush 24 "dead" and brush 25 "alive", thus breaking the circuit for the position indicator lamp for the first floor and completing the circuit for the position indicator lamp for the second floor. The next step of rotative movement of the star wheel effects one step of movement of the brush holders, brush 25 moving into engagement with the first commutator deck stationary contact for the third floor, completing the circuit for the third floor position indicator lamp. The operation is repeated for each floor as the car moves up the hatchway. As brush 25 is moved into engagement with the first commutator deck stationary contact beyond the one for the thirty-ninth floor, a circuit is completed for the restoring coil A234 for the first deck commutator switch and for the operating coil B235 for the second deck commutator switch. It is to be understood that as brush 25 of the lower commutator moves from the second floor stationary contact to the one for the thirty-ninth floor, brush 81 of the upper commutator moves from the forty-second floor stationary contact over all the upper commutator stationary contacts to the one opposite the thirty-ninth floor stationary contact of the lower commuator deck. No circuits are ehstablished through brush 81, however, as contacts B232 are separated. The energization of coils A234 and B235 results in the separation of contacts A230 and A231 and the engagement of contacts B232 and B233. This transfers the circuits from the first to the second commutator deck. Switch 182 being closed at this time, this renders second deck commutator brush 81 "alive". The two brush holders being moved in synchronism, brush 81 moves into engagement with its stationary contact connected to the position indicator lamp for the fortieth floor at the same time that brush 25 moves into engagement with the first deck commutator stationary contact beyond the one for the thirty-ninth floor. Therefore, as the car moves from the thirty-ninth to the fortieth floor, the position indicator lamp for the thirty-ninth floor is extinguished and the lamp for the fortieth floor is lighted. The lamps for the floors above the fortieth floor are lighted in sequence upon continued movement of the elevator car until the fiftieth floor is reached.

During downward movement of the car, these lamps are lighted in reverse sequence, brush 80 being rendered "alive" and brush 81 "dead" as a result of the closing of switch 183 and the opening of switch 182 upon the first step of rotative movement of the star wheel during downward travel. Upon the engagement of brush 80 with the second deck stationary contact below the one for the fortieth floor, a circuit is completed for the restoring coil B236 of the second deck commutator switch and operating coil A237 of the first deck commutator switch. This results in the separation of contacts B232 and B233 and the engagement of contacts A230 and A231, transferring the circuits from the second to the first commutator deck. Brush 24, which is rendered "alive" by this transfer, moves into engagement with the stationary contact for the thirty-ninth floor at the same time that brush 80 moves into engagement with the contact of the second commutator deck below the one for the fortieth floor so that the position indicator lamp for the fortieth floor is extinguished and the one for the thirty-ninth floor is lighted as the car moves from the fortieth to the thirty-ninth floor. The lamps for the floors below the thirty-ninth floor are lighted in sequence upon continued downward movement of the elevator car.

Similar operation is had where triple deck commutating mechanism is employed, the parts for a one hundred floor installation being illustrated in Figure 19. As in the case of Figures 17 and 18, the stationary contacts of the commutating decks in Figure 19 are developed in a straight line. Four latching switches are employed in these circuits, the two additional switches being designated C and D. Switch C is for transferring the circuits from the third commutator deck to the second, while switch D is for transferring the circuits from the second commutator deck to the third.

Assume, as before, that the car is positioned at the lower terminal. Under such conditions, switches A and C are latched in operated condition, and switches B and D are in unlatched condition. Consequently, contacts A230, A231, C240 and C241 are in engagement, and contacts B232, B233, D242 and D243 are separated. Toggle switch 182 is open and toggle switch 183 is closed, as before. Thus, first deck commutator brush 24 is "alive" and first deck brush 25, second deck brushes 80 and 81, and third deck brushes 104 and 105 are "dead". With brush 24 "alive", a circuit is completed for the position indicator lamp for the first floor. The operation of the commutating mechanism to light the lamps from the first to the thirty-ninth floor as the car moves up the hatchway is the same as previously described. Also, the operation of transferring from the first deck to the second deck as the car moves from the thirty-ninth to the fortieth floor is as previously described. The second commutator deck acts in the manner previously described to cause the lighting of the lamps from the fortieth to the seventy-seventh floor as the car moves up the hatchway to the seventy-seventh floor. Upon the engagement of the second deck stationary contact above the one for the seventy-seventh floor by brush 81, a circuit is completed for restoring coil C244 of latching switch C and operating coil D245 of latching switch D. This results in the separation of contacts C240 and C241 and the engagement of contacts D242 and D243. This transfers the circuits from the second to the third commutator deck. Switch 182 being closed at this time, this renders third deck commutator brush 104 "alive". Brush 104 moves into engagement with its stationary contact connected to the position indicator lamp for the seventy-eighth floor at the same time that brush 81 moves into engagement the second deck commutator stationary contact beyond the one for the seventy-seventh floor. Therefore, as the car moves from the seventy-seventh to the seventy-eighth floor, the position indicator lamp for the seventy-seventh floor is extinguished and the lamp for the seventy-eighth floor is lighted. The lamps for the floors above the seventy-eighth floor are lighted in sequence upon continued movement of the elevator car until the one hundredth floor is reached.

During downward movement of the car, these lamps are lighted in reverse sequence, brush 105 being rendered "alive" and brush 104 "dead" as a result of the closing of switch 183 and the opening of switch 182 upon the first step of rotative movement of the star wheel during downward travel. Upon the engagement of brush 105 with the third deck stationary contact below the one for the seventy-eighth floor, a circuit is completed for the restoring coil D246 of latching switch D and for the operating coil C247 of latching switch C. This results in the separation of contacts D242 and D243 and the engagement of contacts C240 and C241, transferring the circuits from the third to the second commutator deck. Brush 80, which is rendered "alive" by this transfer, moves into engagement with the stationary contact for the seventy-seventh floor at the same time that brush 105 moves into engagement with the contact of the third commutator deck below the one for the seventy-eighth floor, so that the position indicator lamp for the seventy-eighth floor is extinguished and the one for the seventy-seventh floor is lighted as the car moves from the seventy-eighth to the seventy-seventh floor. The lighting of the position indicator lamps connected with the stationary contacts of the second commutator deck as the car moves downwardly from the seventy-seventh floor to the fortieth floor and the transfer of the circuits from the second commutator deck to the first, as the car moves from the fortieth to the thirty-ninth floor, are effected in the same manner as described for the circuits illustrated in Figure 18. Brush 24 is rendered "alive" as a result of this transfer, causing the lamps from the thirty-ninth to the first floor to be lighted in sequence, as the car continues its downward movement to the lower terminal.

The above described arrangements reduce the number of wires from the remote control point to the receiving station to a minimum. In the system of Figure 17, seven wires from the control station to the car are sufficient. In the system of Figure 18, eleven wires from the control station to the car are sufficient, provided latching switches A and B are not arranged on the elevator car. In the system of Figure 19, fifteen wires from the control station to the elevator car are sufficient, provided latching switches A, B, C and D are not arranged on the elevator car. It would be desirable to arrange the latching switches at the control station where a position indicator arrangement is also provided at the dispatcher's station, in which event the latching switches would be useful to control the brushes for both sets of commutating mechanisms in parallel. It might be considered desirable to arrange the latching switches at the control station for other reasons. If the latching switches are arranged on the elevator car, seven wires from the control station to the elevator car are sufficient in the systems of both Figure 18 and Figure 19. A marked saving in the weight of the connecting or travelling cable is made possible by this arrangement, because the connecting cables of a directly wired signalling system would ordinarily involve as a minimum as many wires plus one as there are signals to transmit.

Although described as applied to position indicating circuits for elevator installations, it is to be understood that the commutating mechanism is useful for other purposes. As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an elevator installation in which an elevator car serves a plurality of floors; switching mechanism for a group of certain ones of said floors, additional switching mechanism for a group of certain other ones of said floors; means for driving said switching mechanisms in accordance with movement of the elevator car; and means for causing the first named switching mechanism to be effective and the additional switching mechanism to be ineffective when the car is serving said floors of the first group and for causing the additional switching mechanism to be effective and the first named switching mechanism to be ineffective when the car is serving said floors of the second group.

2. In an elevator installation in which an elevator car serves a plurality of floors; commutating mechanism for a group of certain ones of said floors, said mechanism comprising a plurality of stationary contacts, one for each of said certain floors, and a movable contact for engaging said stationary contacts; additional commutating mechanism for a group of certain other ones of said floors, said additional commutating mechanism comprising a plurality of stationary contacts, one for each of said certain floors of the second group, and a movable contact for engaging said stationary contacts; means for moving said movable contacts in accordance with movement of the elevator car; and means for causing the movable contact of the first commutating mechanism to be effective and the movable contact of the additional commutating mechanism to be ineffective when the car is serving said floors of the first group and for causing the movable contact of the additional commutating mechanism to be effective and the movable contact of the first commutating mechanism to be ineffective when the car is serving said floors of the second group.

3. In an elevator installation in which an elevator car serves a plurality of floors; a plurality of superimposed commutating mechanisms, each for a different group of said floors, each of said mechanisms comprising a plurality of stationary contacts, one for each of the floors of the group for which the mechanism is provided, and a movable contact for engaging said stationary contacts; means joining said movable contacts to cause them to be driven in unison; a motor for driving said movable contacts; means for causing operation of said motor in accordance with movement of the elevator car; and means for rendering each of said commutating mechanisms effective when the car is serving the floors for which that mechanism is provided and for rendering that mechanism ineffective when the car is serving the floors of the other groups.

4. In an elevator installation in which an elevator car serves a plurality of floors; a plurality of superimposed commutating mechanisms, each for a different group of said floors, each of said mechanisms comprising a plurality of stationary contacts, one for each of the floors of the group for which the mechanism is provided, radially disposed about a center common to said mechanisms, a contacting brush for engaging said stationary contacts and an operating arm for each of said brushes mounted for rotative movement about said center; means connecting said arms to cause them to be rotated in unison; a motor for driving said connecting means; means for causing operation of said motor in accordance with movement of the elevator car; and means for rendering the brush of each of said commutating mechanisms effective when the car is serving the floors for which that mechanism is provided and for rendering the brush of that mechanism ineffective when the car is serving the floors of the other groups.

5. In an elevator installation in which an elevator car serves a plurality of floors; a plurality of superimposed commutating mechanisms, each for a different group of said floors, each of said mechanisms comprising a plurality of stationary contacts, one for each of the floors of the group for which the mechanism is provided, radially disposed about a center common to said mechanisms, a contacting brush for engaging said stationary contacts, a rotatable operating arm for said brush, and an operating shaft for said arm positioned for rotative movement about said center; means connecting said shafts to cause them to be driven in unison; a step by step motor for driving said shafts; reduction gearing between said shafts and said motor to cause movement of each brush into engagement with its next stationary contact upon each step of rotative movement of said motor; means for causing operation of said motor in accordance with movement of the elevator car in such manner as to cause one step of rotative movement of the motor upon movement of the car from one floor to the next one that it serves; and means for rendering the brush of each of said commutating mechanisms effective when the car is serving the floors for which that mechanism is provided and for rendering the brush of that mechanism ineffective when the car is serving the floors of the other groups.

6. In an elevator installation in which an elevator car serves a plurality of floors; a plurality of superimposed commutating mechanisms, each for a different one of adjacent groups of said floors, each of said mechanisms comprising a plurality of stationary contacts, one for each of the floors of the group for which the mechanism is provided, radially disposed about a center common to said mechanisms, a pair of contacting brushes for engaging said stationary contacts, a rotatable operating arm for said brushes, and an operating shaft for said arm positioned for rotative movement about said center; means connecting said shafts to cause them to be driven in unison; a step by step motor for driving said shafts; reduction gearing between said shafts and said motor to cause movement of each brush into engagement with its next stationary contact upon each step of rotative movement of said motor; means for causing operation of said motor in accordance with movement of the elevator car in such manner as to cause one step of rotative movement of the motor upon movement of the car from one floor to the next one it serves; means for rendering one brush of each commutating mechanism ineffective during travel of the car in one direction and the other brush of each mechanism ineffective during travel of the car in the other direction; and means for rendering the brush of each of said commutating mechanisms for the direction in which the car is travelling effective when the car is serving the floors for which that mechanism is provided and for rendering it ineffective when the car is serving the floors of the other groups.

7. In an elevator installation in which an elevator car serves a plurality of intermediate floors and two terminal floors; a plurality of superimposed commutating mechanisms, each for a different group of said floors, each of said mechanisms comprising a plurality of stationary contacts, one for each of the floors of the group for which the mechanism is provided and contacting means for engaging said stationary contacts; means for moving said contacting means in accordance with movement of the elevator car; means for rendering each of said commutating mechanisms effective when the car is serving the floors for which that commutating mechanism is provided and for rendering that commutating mechanism ineffective when the car is serving the floors of the other groups; and means for correcting said commutating mechanisms, in the event their contacting means are ahead of the car during upward car travel, upon engagement of the contacting means of the top commutating mechanism with the stationary contact for the upper terminal floor, and, in the event their contacting means are ahead of the car during downward car travel, upon engagement of the contacting means of the bottom commutating mechanism with the stationary contact for the lower terminal floor.

8. In an elevator installation in which an elevator car serves a plurality of intermediate floors and two terminal floors; a plurality of superimposed commutating mechanisms, each for a different group of said floors, each of said mechanisms comprising a plurality of stationary contacts, one for each of the floors of the group for which the mechanism is provided, a movable member and contacting means carried by said member for engaging said stationary contacts; means for causing step by step movement of said members in such manner that each contacting means moves into engagement with its next stationary contact upon movement of the car from one floor to the next one that it serves; means for rendering the contacting means of each of said commutating mechanisms effective when the car is serving the floors for which that commutating mechanism is provided and for rendering the contacting means of that commutating mechanism ineffective when the car is serving the floors of the other groups; and means cooperating with the movable member for the top commutating mechanism for correcting said commutating mechanisms when they get out of step, as the car arrives at the upper terminal floor, in the event that the movable members are ahead of the car during up car travel, and as the car arrives at the lower terminal floor in the event that the movable members are ahead of the car during down car travel.

9. In an elevator installation in which an elevator car serves a plurality of intermediate floors and two terminal floors; a plurality of superimposed commutating mechanisms, each for a different group of said floors, each of said mechanisms comprising a plurality of stationary contacts, one for each of the floors of the group for which the mechanism is provided, radially disposed about a center common to said mechanisms, contacting means for engaging said stationary contacts, a rotatable operating arm for said contacting means, and an operating shaft for said arm positioned for rotative movement about said center; means connecting the shafts to cause them to be driven in unison; a step by step motor for driving said shafts; reduction gearing between said shafts and said motor to cause movement of each contacting means into engagement with its next stationary contact upon each step of rotative movement of said motor; means for causing operation of said motor in accordance with movement of the elevator car in such manner as to cause one step of rotative movement of the motor upon movement of the car from one floor to the next one that it serves; switching mechanism controlled by said commutating mechanism for rendering the contacting means of each of said commutating mechanisms effective when the car is serving the floors for which that commutating mechanism is provided and for rendering the contacting means of that commutating mechanism ineffective when the car is serving the floors of the other groups; and means for correcting said mechanisms in the event that the contacting means of the top commutating mechanism is ahead of the car upon its engagement with its stationary contact for the upper terminal floor and for correcting said mechanisms in the event that the contacting means of the bottom commutating mechanism is ahead of the car upon its engagement with its stationary contact for the lower terminal floor.

10. In an elevator installation in which an elevator car serves a plurality of intermediate floors and two terminal floors; a plurality of superimposed commutating mechanisms, each for a different group of said floors, each of said mechanisms comprising a plurality of stationary contacts, one for each of the floors of the group for which the mechanism is provided, radially disposed about a center common to said mechanisms, contacting means for engaging said stationary contacts, and a rotatable operating arm for said contacting means; driven means for effecting rotative movement of said arms in unison; a step by step motor for driving said driven means; reduction gearing between said driven means and said motor to cause movement of each contacting means into engagement with its next stationary contact upon each step of rotative movement of said motor; means for causing operation of said motor in accordance with movement of the elevator car in such manner as to cause one step of rotative movement of the motor upon movement of the car from one floor to the next one that it serves; means for rendering the contacting means of each of said commutating mechanisms effective when the car is serving the floors for which that commutating mechanism is provided and for rendering the contacting means of that commutating mechanism ineffective when the car is serving the floors of the other groups; and means arranged on the top commutating mechanism and cooperating with the operating arm thereof to correct said mechanisms in the event that the contacting means of the top commutating mechanism is ahead of the car upon its engagement with its stationary contact for the upper terminal floor and to correct said mechanisms in the event that the contacting means of the bottom commutating mechanism is ahead of the car upon its engagement with its stationary contact for the lower terminal floor.

11. In an elevator installation in which an elevator car serves a plurality of intermediate floors and two terminal floors, a plurality of superimposed commutating mechanisms, each for a different group of said floors, each of said mechanisms comprising a plurality of stationary contacts, one for each of the floors of the group for which the mechanism is provided, radially disposed about a center common to said mechanism, contacting means for engaging said stationary contacts, and a rotatable operating arm for said contacting means; means for causing simultaneous rotative movement of each arm to move its contacting means into engagement with the next stationary contact upon movement of the car from one floor to the next one that it serves; means for rendering the contacting means of each of said commutating mechanisms effective when the car is serving the floors for which that commutating mechanism is provided and for rendering the contacting means of that commutating mechanism ineffective when the car is serving the floors of the other groups; and means comprising a pair of stops on the top commutating mechanism, one arranged to stop the arm of the top commutating mechanism, during upward travel of the car, in the event it tends to move its contacting means beyond the stationary contact for the upper terminal floor, thus correcting said mechanisms in the event that the contacting means of the top commutating mechanism is ahead of the car upon its engagement with the stationary contact for the upper terminal floor, and the other arranged to stop the arm of the top commutating mechanism, during downward travel of the car, in the event that the arm of the bottom commutating mechanism tends to move its contacting means beyond the stationary contact for the lower terminal floor, thus correcting said mechanisms in the event that the contacting means of the bottom commutating mechanism is ahead of the car upon its engagement with the stationary contact for the lower terminal floor.

In testimony whereof, I have signed my name to this specification.

SELDEN BRADLEY SANFORD.